United States Patent
Yoo et al.

(10) Patent No.: US 11,880,948 B2
(45) Date of Patent: Jan. 23, 2024

(54) METHOD AND APPARATUS FOR TRACKING ENTITY BASED ON FEATURE DATA INDEPENDENT OF AUGMENTED REALITY ENGINE

(71) Applicant: KOREA INSTITUTE OF SCIENCE AND TECHNOLOGY, Seoul (KR)

(72) Inventors: ByoungHyun Yoo, Seoul (KR); YongJae Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 211 days.

(21) Appl. No.: 17/565,455

(22) Filed: Dec. 30, 2021

(65) Prior Publication Data

US 2022/0237876 A1 Jul. 28, 2022

(30) Foreign Application Priority Data

Jan. 22, 2021 (KR) .......................... 10-2021-0009217
Aug. 23, 2021 (KR) .......................... 10-2021-0111237

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2200/04* (2013.01); *G06T 2219/004* (2013.01); *G06T 2219/2004* (2013.01)

(58) Field of Classification Search
None
See application file for complete search history.

(56) References Cited

U.S. PATENT DOCUMENTS

2020/0012858 A1* 1/2020 Xiang ..................... G06T 15/06

* cited by examiner

*Primary Examiner* — Nicholas R Wilson
(74) *Attorney, Agent, or Firm* — CANTOR COLBURN LLP

(57) ABSTRACT

A method and an apparatus for tracking an entity based on feature data independent of an augmented reality engine are provided. A URI for feature data of an entity is generated from a combination of a name of the entity and a name of an AR engine, feature data of the entity representing characteristics of the entity is acquired in a format capable of being processed by the AR engine by using the URI, the entity is tracked in an augmented reality space by executing the AR engine based on the acquired feature data, and thus, an entity based on feature data independent of an augmented reality engine may be tracked.

11 Claims, 7 Drawing Sheets

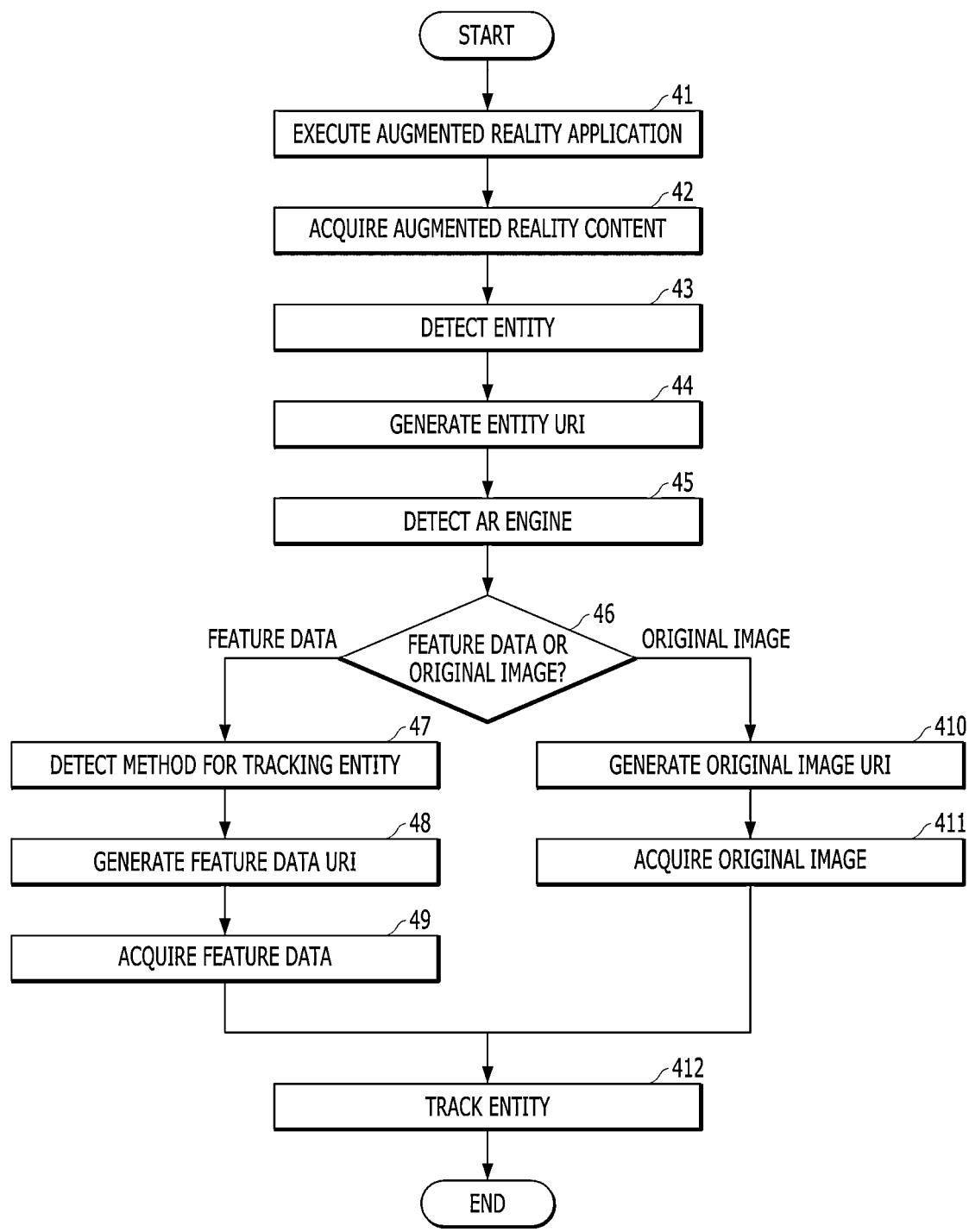

FIG. 7

| AR Engine | Tracking | Entity URI | |
|---|---|---|---|
| | | /outdoor/house/Original Image | /indoor/cat/Original Image |
| ARCore | 2D Image | /outdoor/house/ARCore/ AugmentedImages | - |
| | 3D Object | - | - |
| ARKit | 2D Image | /outdoor/house/ARKit /ARImageTracking | - |
| | 3D Object | - | /indoor/cat/ARKit /ARObjectScanning |
| Vuforia | 2D Image | /outdoor/house/Vuforia /ImageTargets | - |
| | 3D Object | - | /indoor/cat/Vuforia /ModelTargets |
| Wikitude | 2D Image | /outdoor/house/Wikitude /ImageTracking | - |
| | 3D Object | - | /indoor/cat/Wikitude /ObjectTracking |

METHOD AND APPARATUS FOR TRACKING ENTITY BASED ON FEATURE DATA INDEPENDENT OF AUGMENTED REALITY ENGINE

CROSS-REFERENCE TO RELATED APPLICATION

This application claims the benefits of Korean Patent Application No. 10-2021-0009217, filed on Jan. 22, 2021 and Korean Patent Application No. 10-2021-0111237, filed on Aug. 23, 2021, in the Korean Intellectual Property Office, the disclosures of which are incorporated herein in their entireties by reference.

BACKGROUND

1. Field

The present disclosure relates to a method and an apparatus for tracking an entity in an augmented reality space.

2. Description of the Related Art

Augmented reality (AR) is a technology that overlaps a virtual image on an image of a real space and shows one image, and there is at least one entity to be displayed by overlapping the virtual image in an augmented reality space corresponding to the real space. Because movement of an entity in the real space has to be reflected in the augmented reality space, an entity tracking technology is a representative technology provided by an augmented reality application. This entity tracking is performed by an augmented reality engine used by the augmented reality application. Hereinafter, the augmented reality engine will be briefly referred to as an "AR engine".

The entity tracking technology may be divided into a technology for tracking a two-dimensional image and a technology for tracking a three-dimensional object. When the entity corresponds to the two-dimensional image, the AR engine generates feature data representing characteristics of the two-dimensional image from the two-dimensional image and tracks the entity in the augmented reality space by using the feature data. When the entity corresponds to the three-dimensional object, the AR engine generates feature data representing characteristics of the three-dimensional object from a plurality of images representing the three-dimensional object and tracks the entity in the augmented reality space by using the feature data. As such, an algorithm for generating feature data varies depending on whether the tracking is performed for the two-dimensional image or the three-dimensional object.

The augmented reality application is divided into a native application and a web application. The native application is developed based on a software development kit (SDK) provided by a platform such as Android and iOS of Google Company and may be executed on only the platform supported by the SDK. The web application is written in a web language such as a hypertext markup language (HTML), client side script (CSS), or Java script (JS) and may be executed on both Android and iOS.

Because various types of augmented reality applications use different AR engines and formats of feature data used by each AR engine are different from each other, respective augmented reality applications have to generate feature data in a format suitable for the AR engine used thereby. Accordingly, the augmented reality application of the related art includes a feature data generation algorithm dependent on the augmented reality engine.

Because each AR engine has a different algorithm for generating feature data and a different feature matching algorithm, some AR engines show superior tracking performance for two-dimensional images or superior tracking performance for specific shapes of entities compared to other AR engines but may show poor tracking performance for other types and shapes of entities such as three-dimensional objects. Accordingly, development of augmented reality applications using various types of AR engines is being attempted, and the augmented reality application has to include a plurality of feature data generation algorithms for all AR engines used thereby, and thus, there are problems that development of the augmented reality application becomes more and more difficult and a size of the augmented reality application increases.

SUMMARY

The present disclosure provides an apparatus and a method for tracking an entity based on feature data independent of an augmented reality engine that may track an entity in an augmented reality space by acquiring feature data independently of the augmented reality engine and executing an AR engine without using a feature data generation algorithm dependent on the augmented reality engine.

In addition, the present disclosure provides a computer-readable recording medium in which a program for executing the method for tracking an entity is recorded. Technical problems are not limited to the technical problems described above, and another technical problem may be derived from the following description.

According to an aspect of the present disclosure, a method for tracking an entity based on feature data independent of an augmented reality engine includes generating a uniform resource identifier (URI) for feature data of a first entity from a combination of a name of the first entity and a name of a first AR engine; acquiring feature data of the first entity representing characteristics of the first entity in a format capable of being processed by the first AR engine by using the URI for the feature data of the first entity; and tracking the first entity in an augmented reality space by executing the first AR engine based on the acquired feature data of the first entity.

During the generating of the URI for the feature data of the first entity, the URI for the feature data of the first entity may be generated from a combination of a host name of a resource server, a name of the first entity, and a name of the first AR engine, and during the acquiring of the feature data of the first entity, the feature data of the first entity may be acquired from the resource server by requesting the resource server corresponding to a host of the URI for the feature data of the first entity to send the feature data of the first entity by using the URI for the feature data of the first entity.

The method for tracking the entity may further include generating the URI of the first entity from a combination of the host name of the resource server and the name of the first entity; and detecting the first AR engine to be used for tracking the first entity from among a plurality of AR engines, wherein, during the generating of the URI for the feature data of the first entity, the URI for the feature data of the first entity may be generated by adding a name of the detected first AR engine to the generated URI of the first entity.

The method for tracking the entity may further include detecting an entity tracking method to be used by the first AR engine for the first entity, wherein, during the generating of the URI for the feature data of the first entity, the URI for the feature data of the first entity may be generated by adding a name of the detected first AR engine and a name of the detected entity tracking method to the generated URI of the first entity.

During the detecting of the entity tracking method, the entity tracking method to be used by the first AR engine may be detected according to whether the first entity corresponds to a two-dimensional image or a three-dimensional object.

The method for tracking the entity may further include detecting at least one entity in the augmented reality space indicated by augmented reality content from the augmented reality content, wherein, during the generating of the URI for the feature data of the first entity, the URI for the feature data of the first entity may be generated from a combination of the name of the first entity and the name of the first AR engine among the detected at least one entity.

The method for tracking the entity may further include generating a URI for feature data of a second entity from a combination of a name of the second entity and a name of a second AR engine; acquiring feature data of the second entity representing characteristics of the second entity in a format capable of being processed by the second AR engine by using the URI for the feature data of the second entity; and tracking the second entity in an augmented reality space by executing the second AR engine based on the acquired feature data of the second entity.

The method for tracking the entity may further include determining whether the first AR engine requires either the feature data of the first entity or an original image of the first entity in order to track the first entity, wherein, during the generating the URI for the feature data of the first entity, the URI for the feature data of the first entity may be generated when the first AR engine is determined to require the feature data of the first entity.

The method for tracking the entity may further include generating a URI for the original image of the first entity from the combination of the host name of the resource server and the name of the first entity when the first AR engine is determined to require the original image of the first entity; acquiring the original image of the first entity by using the URI for the original image of the first entity; and tracking the first entity in the augmented reality space by executing the first AR engine based on the acquired original image of the first entity.

According to another aspect of the present disclosure, a computer-readable recording medium in which a program for executing the method for tracking an entity on a computer is recorded.

According to another aspect of the present disclosure, an apparatus for tracking an entity based on feature data independent of an augmented reality engine includes a URI processing unit configured to generate a URI for feature data of a first entity from a combination of a name of the first entity and a name of a first AR engine; and an AR processing unit configured to acquire the feature data of the first entity representing characteristics of the first entity in a format capable of being processed by the first AR engine by using the URI for the feature data of the first entity and configured to track the first entity in an augmented reality space by executing the first AR engine based on the acquired feature data of the first entity.

BRIEF DESCRIPTION OF THE DRAWINGS

These and/or other aspects will become apparent and more readily appreciated from the following description of the embodiments, taken in conjunction with the accompanying drawings in which:

FIG. 4 is a flowchart illustrating a method for tracking an entity according to an embodiment of the present disclosure;

FIG. 7 is a diagram illustrating an example of a uniform resource identifier (URI) table stored in a resource server illustrated in FIG. 1.

DETAILED DESCRIPTION

Hereinafter, embodiments of the present disclosure will be described in detail with reference to the drawings. The embodiments of the present disclosure described below relate to a method and an apparatus for tracking an entity based on feature data independent of an augmented reality (AR) engine that may track entity in an augmented reality space by implementing an AR engine by acquiring feature data independently of the AR engine without using a feature data generation algorithm dependent on the AR engine.

Hereinafter, a method for tracking an entity based on feature data independent of an AR engine may be briefly referred to as an "entity tracking method", and an apparatus for tracking an entity based on feature data independent of an AR engine is briefly referred to as an "entity tracking apparatus" or an "AR client". Hereinafter, the term "augmented reality" may be briefly referred to as "AR" and "URI" is an abbreviation of "uniform resource identifier".

Figure 1:
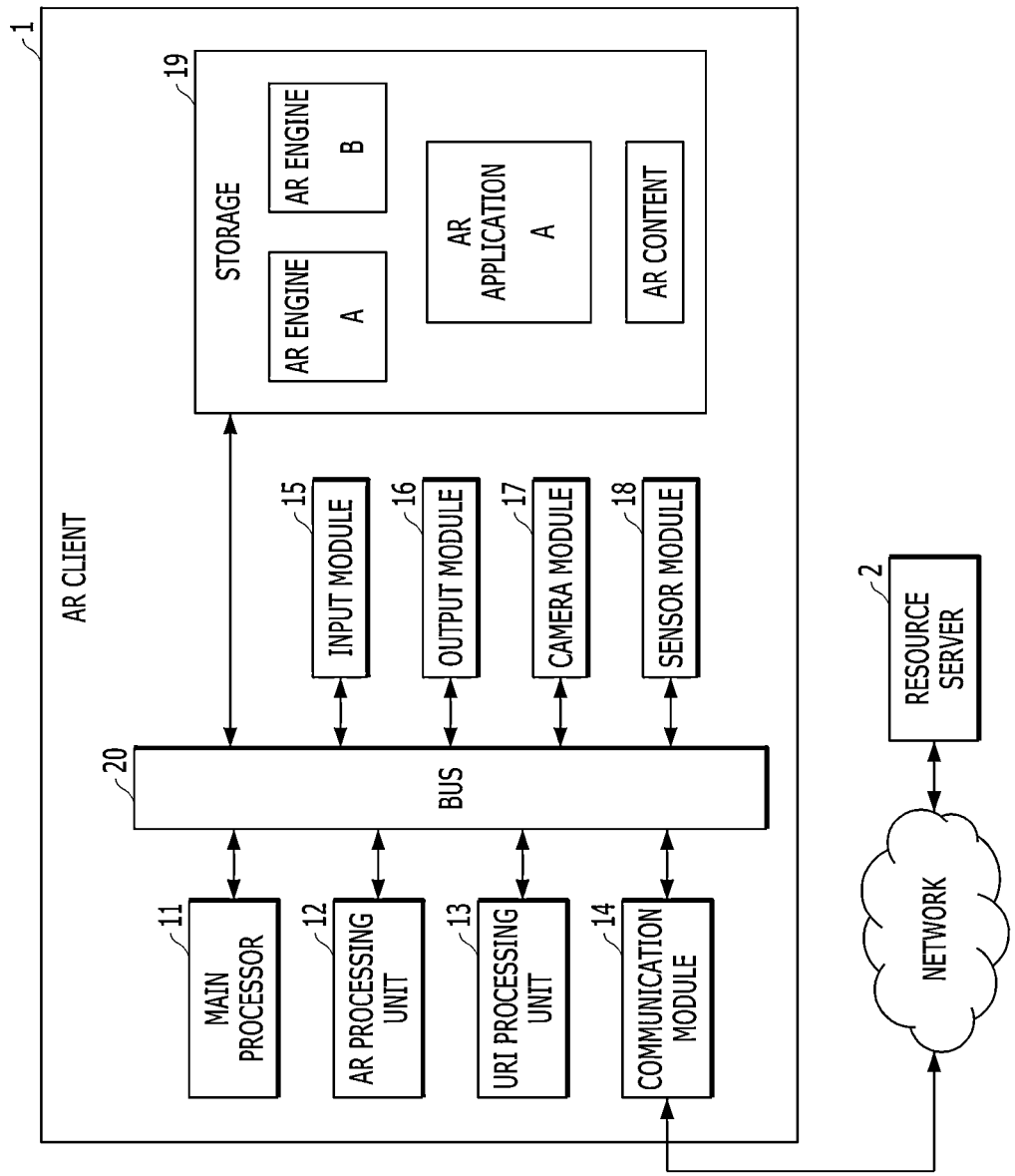
FIG. 1 is a block diagram of an augmented reality (AR) client according to an embodiment of the present disclosure.

FIG. 1 is a block diagram of an AR client 1 according to an embodiment of the present disclosure. Referring to FIG. 1, the AR client 1 according to the present embodiment includes a main processor 11, an AR processing unit 12, a URI processing unit 13, a communication module 14, an input module 15, an output module 16, a camera module 17, a sensor module 18, a storage 19, and a bus 20. The AR client 1 according to the present embodiment tracks at least one entity existing in an augmented reality space and displays a virtual image overlapped on the tracked entity. Accordingly, the AR client 1 according to the present embodiment may also be referred to as an entity tracking apparatus.

The main processor 11 executes a certain application and controls the AR processing unit 12, the URI processing unit 13, the input module 15, the output module 16, the communication module 14, the camera module 17, and the sensor module 18 according to program codes of the application and reads data from or stores data in the storage 19. In particular, the main processor 11 according to the present embodiment executes an AR application to be described below. The main processor 11 may include, for example, a central processing unit (CPU), an application processor (AP), or so on.

The AR processing unit 12 acquires, interprets, and renders augmented reality content according to execution of an augmented reality application. The URI processing unit 13 generates a URI for each entity, a URI for feature data of a certain entity, and a URI for an original image of a certain entity according to the execution of the augmented reality application. In the present embodiment, an original image of a certain entity indicates data representing a two-dimensional image or a three-dimensional image of the entity. The AR processing unit 12 and the URI processing unit 13 are processors that operate according to execution of an augmented reality application and may also be physically the same as the main processor 11 or may also be a separate dedicated processor used by the main processor 11 such as a graphics processing unit 9 (GPU).

The communication module 14 communicates with a resource server 2 or other servers through a network such as the Internet. The communication module 14 may communicate with the resource server 2 or other servers according to various communication methods such as long term evolution (LTE) as Wi-Fi. The input module 15 receives a user's command, selection, information, and so on. The input module 15 may include, for example, a touch panel, a keyboard, and a mouse. The output module 16 may be configured with a combination of an image output device such as a display panel and an audio output device such as a speaker to provide audiovisual output to a user.

The camera module 17 generates an image of a real space by imaging a space in which the AR client 1 is currently located. The sensor module 18 detects current position and posture of the AR client 1 by using a gyroscope, an accelerometer, a global positioning system (GPS) sensor, and so on to generate current position information and current posture information of the AR client 1. The position information of the AR client 1 may be represented by three-dimensional coordinate values of x, y, and z in the augmented reality space corresponding to a three-dimensional coordinate system. The posture information of the AR client 1 may be represented by a roll value indicating a rotation angle in the x-axis direction, a pitch value indicating a rotation angle in the y-axis direction, and a yaw value indicating a rotation angle in the z-axis direction.

The storage 19 stores an augmented reality application, data used during execution thereof, and so on. According to the example illustrated in FIG. 1, an augmented reality application A, an AR engine A, an AR engine B, augmented reality content, and so on are stored in the storage 19. Each AR engine is a function program that is called by the augmented reality application to perform entity tracking. The bus 20 serves to transmit data between the various components described above, such as the main processor 11, the AR processing unit 12, and the URI processing unit 13.

Figure 2A:
FIGS. 2A and 2B are views illustrating examples of feature data for a two-dimensional image.
Figure 2B:

The resource server 2 has a database of stored feature data layered by a plurality of entities, a plurality of AR engines, and a plurality of entity tracking methods by using a URI system, and provides feature data corresponding thereto when receiving a certain URI FIGS. 2A and 2B are views illustrating examples of feature data for a two-dimensional image. FIG. 2A illustrates a two-dimensional image of a certain house, and FIG. 2B illustrates feature data for the two-dimensional image illustrated in FIG. 2A. Cross points illustrated in FIG. 2B correspond to feature points of the two-dimensional image illustrated in FIG. 2B, The feature data for the two-dimensional image is binary data representing the feature points. FIG. 2B visually illustrates the binary data in order to help the understanding of the feature data of the two-dimensional image. Each AR engine detects a portion corresponding to the feature data of the two-dimensional image in each of a plurality of real space images continuously input from the camera module 17 and tracks each entity in an augmented reality space corresponding to the real space from a change trend in the detected portion in the real space indicated by the plurality of real space images.

Figure 3A:
FIGS. 3A and 3B are views illustrating examples of feature data for a three-dimensional object
Figure 3B:
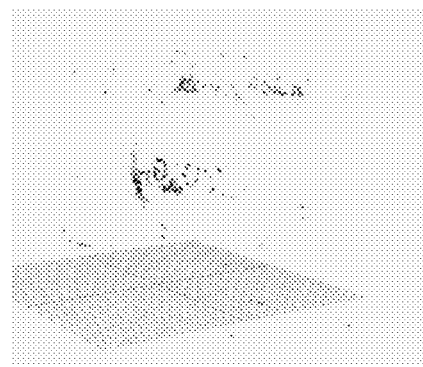

FIGS. 3A and 3B are views illustrating examples of feature data for a three-dimensional object. FIG. 3A illustrates any one of a plurality of two-dimensional images of a cat doll corresponding to a three-dimensional object. In order to represent a three-dimensional object, a plurality of two-dimensional images of a cat doll imaged from various angles are required. FIG. 3B illustrates feature data generated from the plurality of two-dimensional images of the cat doll, Points of the three-dimensional coordinate system illustrated in FIG. 3B correspond to feature points of the cat doll corresponding to the three-dimensional object. Feature data for the three-dimensional object is binary data representing the feature points. FIG. B visually illustrates the binary data in order to help understanding of the feature data of the three-dimensional object, Each AR engine may detect a portion corresponding to the feature data of the three-dimensional object in each of a plurality of real space images continuously input from the camera module 17 and may track each entity in an augmented reality space corresponding to the real space from a change trend in the detected portion in the real space indicated by the plurality of real space images.

FIG. 4 is a flowchart of a method for tracking an entity according to an embodiment of the present disclosure. Refuting to FIG. 4, the method for tracking an entity according to the present embodiment includes steps processed in time series by the AR client 1 illustrated in FIG. 1. Accordingly, although omitted below, the contents described above with respect to the AR client 1 illustrated in FIG. 1 are also applied to the method for tracking an entity to be described below. The method for tracking an entity according to this embodiment may be implemented as an augmented reality application and may be performed by the main processor 11, the AR processing unit 12, the URI processing unit 13, and so on of the AR client 1. Hereinafter, respective components such as the main processor 11, the AR processing unit 12, the URI processing unit 13, and so on of the AR client 1 will be described in detail with reference to FIG. 4.

In step 41, the main processor 11 of the AR client 1 executes an augmented reality application A when receiving a command to execute the augmented reality application A according to the present embodiment from a user through the input module 15. The augmented reality application A is previously downloaded from the resource server 2 or another server and installed in the AR client 1 before execution thereof. The augmented reality application A may also be provided by the resource server 2 or may also be provided by another server. The augmented reality application A may be written in a computer programming language such as Java. Following steps are performed by the AR processing unit 12 and the URI processing unit 13 according to execution of the augmented reality application A.

In step 42, the AR processing unit 12 of the AR client 1 displays information about various types of augmented reality contents that may be provided by the augmented reality application A to a user through the output module 16. The user selects any one of the augmented reality contents that the user wants to experience among the various types of augmented reality contents indicated by the displayed information. When the AR processing unit 12 receives user selection information for any one of at least one augmented reality content that may be provided by the augmented reality application A through the input module 15, the AR processing unit 12 acquires any one augmented reality content indicated by the user selection information from the resource server 2 or another server through the communication module 14. The augmented reality content may also be provided by the resource server 2 or may also be provided by another server. The communication module 14 transmits an augmented reality content request of the AR processing unit 12 to the resource server 2 or another server through the network to receive augmented reality content from the resource server 2 or other server and transmits the augmented reality content to the AR processing unit 12.

In step 43, the AR processing unit 12 of the AR client 1 detects at least one entity in an augmented reality space indicated by the augmented reality content from the augmented reality content by analyzing the augmented reality content received in step 44. The augmented reality content represents each scene in the augmented reality space, in which at least one virtual image overlaps a real space image, in a structured format, and includes information on at least one entity existing in the augmented reality space, for example, names of each entity. In this way, the AR processing unit 12 may detect the names of each entity in the augmented reality space by analyzing the augmented reality content.

Each entity existing in the augmented reality space is an element in which virtual images corresponding to respective entities overlap each other to be displayed and may be classified as a two-dimensional image or a three-dimensional object. Each entity in the augmented reality space has to be tracked because a virtual image is displayed at a current position thereof. When an entity is a three-dimensional object, the virtual image may be displayed differently depending on a current posture thereof, and thus, the posture may also be tracked along with the position. In the present embodiment, tracking the entity means tracking the position of the entity or tracking the position and posture of the entity.

The augmented reality content may be written in a markup language such as extensible markup language (XML). The augmented reality content according to the present embodiment may also represent an image of a single frame or an image of a plurality of frames. The augmented reality content according to the present embodiment may also be a mixed reality content displayed as an augmented reality image or a virtual reality image according to a rendering mode.

In step 44, the URI processing unit 13 generates a URI for each entity from a combination of a host name of the resource server 2 and names of each entity detected in step 43. The URI processing unit 13 may generate the URI for each entity by adding the names of each entity detected in step 42 to the host name of the resource server 2. For example, when using augmented reality content to overlap a virtual image indicating an address of a house on a house existing in a real space and display the overlapped image, the URI processing unit 13 may generate a URI "http://server.com.house" of the entity by adding a name "house" of the entity to a host name "server.com" of the resource server 2.

For example, when using augmented reality content to overlap a virtual image representing a change in expression according to weather in a real space on the face of a cat doll existing in a certain real space and display the overlapped image, the URI processing unit 13 may generate an URI "http://server.com/cat" of the entity by adding a name "cat" of the entity to the host name "server.com" of the resource server 2. The host name "server.com" of the resource server 2 may be included in an augmented reality application or may also be included in augmented reality content.

In step 45, the AR processing unit 12 detects an AR engine to be used for tracking each entity detected in step 41 from among a plurality of AR engines. The AR processing unit 12 may detect a name of the AR engine to be used for tracking the entity from setting information of the augmented reality application A or from an analysis result of the augmented reality content in step 43. The augmented reality content may include a name of an AR engine most suitable for tracking each entity existing in an augmented reality space representing the augmented reality content. The augmented reality application A may be designed such that a user may select any one of a plurality of AR engines. In this case, the user may select any one of the plurality of AR engines during setting an execution environment of the augmented reality application A.

In step 46, the AR processing unit 12 determines whether the AR engine detected in step 45 requires either feature data or an original image of the entity to track the entity detected in step 43, based on an attribute of the AR engine detected in step 45. When it is determined in step 46 that the AR engine requires the feature data of the entity, the processing proceeds to step 47. When it is determined in step 46 that the AR engine requires the original image of the entity, the processing proceeds to step 410. For example, when an attribute of AR engine A is set to constantly perform a process of generating feature data thereof from a two-dimensional image before tracking the two-dimensional image, the AR engine A requires two-dimensional image data, not the feature data.

In step 47, the AR processing unit 12 detects an entity tracking method to be used by the AR engine detected in step 45 for each entity detected in step 43. In more detail, the AR processing unit 12 may detect an entity tracking method to be used by the AR engine detected in step 45 for each entity detected in step 43 according to whether each entity detected in step 43 corresponds to a two-dimensional image or a three-dimensional object. A method for tracking the two-dimensional image and a method for tracking the three-dimensional object in an augmented reality space differ from each other because a data format between the two-dimensional image and the three-dimensional object.

In step 48, the URI processing unit 13 generates a URI for the feature data of each entity detected in step 43 by adding the name of the AR engine detected in step 45 and the name of the entity tracking method detected in step 47 to the URI for each entity generated in step 44. In this way, the URI processing unit 13 generates the URI for the feature data of each entity detected in step 43 from a combination of the host name of the resource server 2, the name of each entity detected in step 43, the name of the AR engine detected in step 45, and the name of the entity tracking method detected in step 47.

Figure 5:
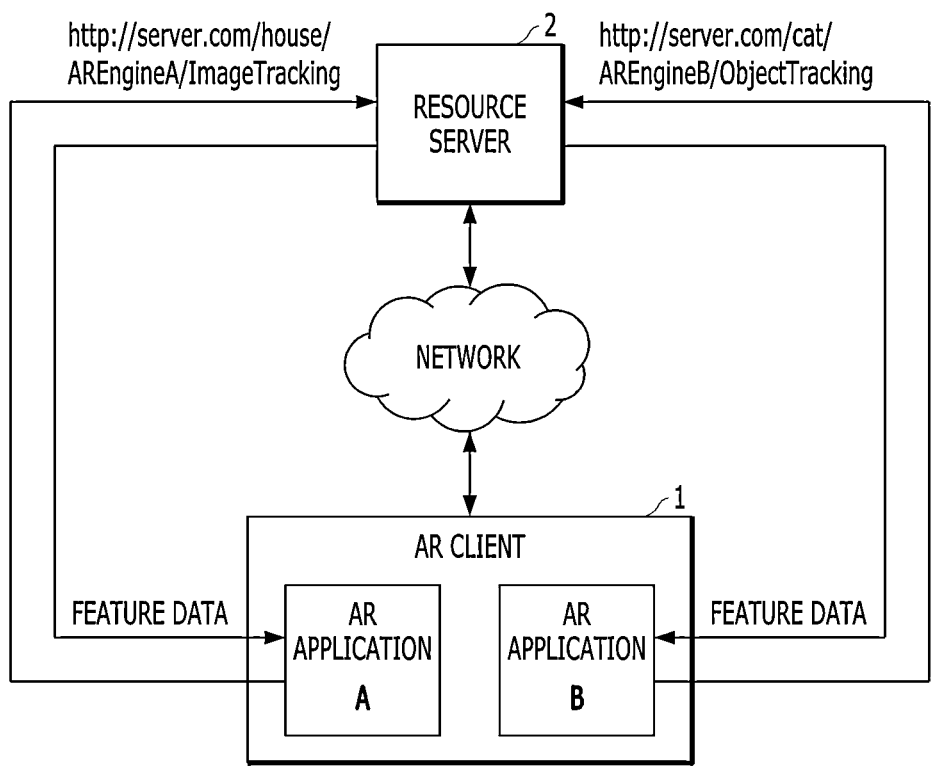
FIG. 5 is a diagram illustrating an example of a process of acquiring feature data of the AR client illustrated in FIG. 1.

FIG. 5 is a diagram illustrating an example of a process of acquiring feature data of the AR client 1 illustrated in FIG. 1. For example, assuming that the name of the entity detected in step 43 is a name "house" of the two-dimensional image illustrated in FIG. 2 and the name of the AR engine detected in step 45 is "AREngineA" and the name of the entity tracking method detected in step 47 is "ImageTracking", a URI for the feature data of the two-dimensional image entity illustrated in FIG. 2 becomes "http://server.com/house/AREngineA/ImageTracking". For example, assuming that the name of the entity detected in step 43 is a name "cat" of the three-dimensional object illustrated in FIG. 3 and the name of the AR engine detected in step 45 is "AREngineB" and the name of the entity tracking method detected in step 47 is "ObjectTracking", a URI for the feature data of the three-dimensional object entity illustrated in FIG. 3 becomes "http://server.com/house/AREngineB/ObjectTracking".

The AR processing unit 12 and the URI processing unit 13 operate according to execution of an augmented reality application and operate according to program codes of the augmented reality application, thereby being illustrated in a form in which the augmented reality application provides a URI and acquires feature data to help understanding of the present embodiment.

In step 49, the AR processing unit 12 acquires feature data of each entity representing characteristics of each entity in a format capable of being processed by the AR engine detected in step 45 by using the URI for the feature data of each entity generated in step 49 to. The AR processing unit 12 is connected to the resource server 2 corresponding to a host of a URI by using the URI for the feature data for each entity generated in step 49 to request feature data of each entity indicating characteristics of each entity and to acquire the feature data of each entity from the resource server 2 as a response to the request. The communication module 14 transmits the request of the AR processing unit 12 to the resource server 2 through the network and receives a response to the request from the resource server 2 and transmits the response to the AR processing unit 12.

As illustrated in FIG. 5, assuming that the URI for the feature data of the two-dimensional image entity illustrated in FIG. 2 is "http://server.com/house/AREngineA/ImageTracking", the AR client 1 may be connected to the resource server 2 by using the URI and acquire the feature data of the two-dimensional image entity illustrated in FIG. 2 from the resource server 2. As illustrated in FIG. 5, assuming that the URI for the feature data of the three-dimensional object entity illustrated in FIG. 3 is "http://server.com/house/AREngineB/ObjectTracking", the AR client 1 may be connected to the resource server 2 by using the URI and acquire the feature data of the three-dimensional object entity illustrated in FIG. 3 from the resource server 2.

In step 410, the URI processing unit 13 generates a URI for an original image of each entity detected in step 43 by adding "originalImage" to the URI for each entity generated in step 44. Here, the original image of each entity indicates data representing a two-dimensional image or a three-dimensional image of each entity. The feature data of each entity has a very small data size compared to the original image of each entity, and thus, entity may be efficiently tracked.

In step 411, the AR processing unit 12 acquires the original image of each entity detected in step 43 by using the URI for the original image of each entity generated in step 49. The AR processing unit 12 is connected to the resource server 2 by using the URI for the original image for each entity generated in step 49 to request the original image of each entity and acquires the original image of each entity from the resource server 2 as a response to the request. The communication module 14 transmits the request of the AR processing unit 12 to the resource server 2 through the network and receives a response to the request from the resource server 2 and transmits the response to the AR processing unit 12. Here, the original image of each entity indicates data representing a two-dimensional image of each entity.

In step 412, the AR processing unit 12 executes the AR engine detected in step 45 based on the feature data acquired in step 49 or the original image acquired in step 411, thereby tracking each entity in the augmented reality space indicated by the augmented reality content received in step 42. When the AR engine detected in step 45 is executed based on the original image acquired in step 411, the AR engine generates feature data of the original image from the original image. The augmented reality space indicates a space to be expressed by being augmented by using a virtual image by augmented reality content in a real space where the AR client 1 is currently located and may be all or a part of the real space.

The AR processing unit 12 may detect a portion corresponding to the feature data of each entity in each of a plurality of real space images continuously input from the camera module 17 and may track positions of each entity in the augmented reality space from a change trend of a position of the detected portion in the real space indicated by the plurality of real space images continuously input from the camera module 17. The AR processing unit 12 may also track a posture of each entity in the augmented reality space from a change trend of a posture of a detected portion in a real space indicated by a plurality of images continuously input from the camera module 17.

Subsequently, the AR processing unit 12 renders the augmented reality content received in step 42, thereby generating an augmented reality image obtained by overlapping a virtual image of each entity on a position of each entity tracked in step 412 for the plurality of real space images input in real time from the camera module 17. The AR processing unit 12 may also rotate virtual images of each entity according to a change in the posture of each entity to overlap each other by referencing a position and a posture of each entity tracked in step 412 for each of a plurality of real space images. The output module 16 displays the augmented reality image generated in this way. This step is omitted in FIG. 4 because the embodiment illustrated in FIG. 4 relates to the entity tracking method.

Figure 6:
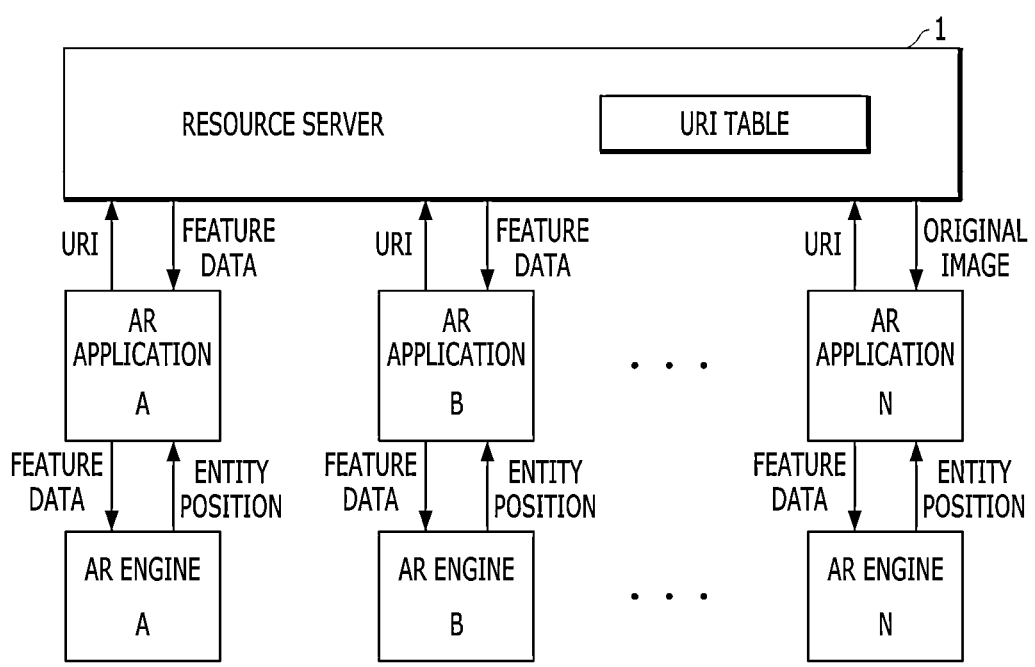
FIG. 6 is a diagram illustrating an example of execution of a plurality of augmented reality applications according to another embodiment of the present disclosure.

FIG. 6 is a diagram illustrating an example of execution of a plurality of augmented reality applications according to another embodiment of the present disclosure. According to the example illustrated in FIG. 6, the plurality of augmented reality applications and a plurality of AR engines correspond to each other on a one-to-one basis. In another example, one AR application may also use a plurality of AR engines, and in another example, a plurality of AR applications may also use one AR engine. The plurality of augmented reality applications may be installed in one AR client 1, and each of which may be installed in each of a plurality of AR clients 1.

When the augmented reality application A is executed and detected entity is set as "entity A" and an attribute of the AR engine A is set to be executed based on feature data of the entity A, step 41 to step 49 and step 412 are performed to track the entity A. That is, the URI processing unit 13 generates a URI for the feature data of the entity A from a combination of a host name of the resource server 2, a name of entity A among at least one entity detected in step 43, a name of the AR engine A detected in step 45, and a name of the entity tracking method detected in step 47. Subsequently, the AR processing unit 12 acquires feature data representing characteristics of the entity A in a format capable of being processed by the AR engine A by using the URI.

Subsequently, the AR processing unit 12 performs tracking of the entity A in an augmented reality space by executing the AR engine A based on the feature data acquired in this way. The AR processing unit 12 and the URI processing unit 13 operate according to execution of an augmented reality application and operate according to program codes of the augmented reality application, thereby being illustrated in a form in which the augmented reality application provides a URI and acquires feature data to help understanding of the present embodiment.

As described above, each AR engine is a kind of function program that performs entity tracking independently of an augmented reality application, and the AR processing unit 12 calls the AR engine A to input feature data of the entity A thereto and to execute the AR engine A. Subsequently, the AR engine A returns an entity tracking result obtained by the AR engine A, for example, a position of the entity A to the AR processing unit 12. Subsequently, the AR processing unit 12 overlaps a virtual image of each entity A onto the position of the entity A for each of a plurality of real space images input in real time from the camera module 17, thereby generating an augmented reality image for each real space image.

When the augmented reality application B is executed and detected entity is set as "entity B" and an attribute of the AR engine B is set to be executed based on feature data of the entity B, step 41 to step 49 and step 412 are performed to track the entity B, That is, the URI processing unit 13 generates a URI for the feature data of the entity B from a combination of a host name of the resource server 2, a name of entity B among at least one entity detected in step 43, a name of the AR engine B detected in step 45, and a name of the entity tracking method detected in step 47. Subsequently, the AR processing unit 12 acquires feature data representing characteristics of the entity B in a format capable of being processed by the AR engine B by using the URI.

Subsequently, the AR processing unit 12 performs tracking of the entity B in an augmented reality space by executing the AR engine B based on the feature data acquired in this way. In more detail, the AR processing unit 12 calls the AR engine B to input feature data of the entity B thereto and to execute the AR engine B. Subsequently, the AR engine B returns an entity tracking result obtained by the AR engine B, for example, a position of the entity B to the AR processing unit 12. Subsequently, the AR processing unit 12 overlaps a virtual image of each entity B onto the position of the entity B for each of a plurality of real space images input in real time from the camera module 17, thereby generating an augmented reality image for each real space image.

When the augmented reality application N is executed and detected entity is set as "entity N" and an attribute of the AR engine N is set to be executed based on feature data of the entity N, step 41 to step 46 and step 410 to step 412 are performed to track the entity N. That is, the URI processing unit 13 generates a URI for an original image of the entity N from a certain combination of a host name of the resource server 2, a name of the entity N among at least one entity detected in step 43. Subsequently, the AR processing unit 12 acquires the original image of the entity N by using the URI.

Subsequently, the AR processing unit 12 performs tracking of the entity N in an augmented reality space by executing the AR engine N based on the obtained original image. In more detail, the AR processing unit 12 calls the AR engine N to input the original image of the entity N thereto and to execute the AR engine N. Subsequently, the AR engine N returns a result of the entity tracking obtained by the AR engine N, for example, a position of the entity N to the AR processing unit 12. Subsequently, the AR processing unit 12 overlaps a virtual image of each entity N onto the position of the entity N for each of a plurality of real space images input in real time from the camera module 17, thereby generating an augmented reality image for each real space image. A process of executing another augmented reality application is also performed according to any one of the two examples described above.

FIG. 7 is a diagram illustrating an example of a URI table stored in the resource server 2 illustrated in FIG. 1. The URI table illustrated in FIG. 7 is a database of feature data that is stored by being layered and for each of a plurality of entities, a plurality of AR engines, and a plurality of entity tracking methods by using a URI system and is visualized for better understanding thereof. Since each URI in the URI table illustrated in FIG. 7 indicates where feature data or original images of entity are stored in the database of the resource server 2, The AR client 1 may quickly acquire feature data or original images of each entity. According to the URI table illustrated in FIG. 7, the plurality of AR engines are classified into "ARCore", "ARKit", "Vuforia", and "Wikitude".

As described above, assuming that an attribute of a certain AR engine is set to constantly perform a process of generating feature data of entity from an original image of the entity before tracking the entity, the AR engine requires the original image, not the feature data. In this case, assuming that a name of the entity detected in step 43 is "house", a URI for the original image of the entity may be "http://server.com/outdoor/house/OriginalImage". Assuming that a name of the entity detected in step 43 is "cat", the URI for the original image of the entity may be "http://server.com/indoor/cat/OriginalImage".

Since original images of certain entities are the same as each other regardless of the type of each AR engine, it is desirable to unify a URI for an original image for each entity in this way in terms of efficient use of a data storage space of the resource server 2. When the number of entities managed by the resource server 2 is greatly increased, the URI for each entity may be hierarchically defined by grouping multiple entities in order to quickly access a storage location of feature data or original images of each entity. That is, a URI of a certain entity may be generated by adding an entity name to a name of a group to which the entity belongs.

"ARCore" is a native AR engine capable of being executed on only the Android platform of Google Company and provides a "Motion tracking" function of estimating a camera position in a real space, an "Environment understanding" function of estimating geometry of a real space, an "Augmented images" function of tracking a two-dimensional image, and so on. "ARCore" does not provide a function of tracking a three-dimensional object.

Assuming that the two-dimensional image illustrated in FIG. 2 is the entity detected in step 43, a URI of the entity generated in step 44 is "http://server.com/outdoor/house". Assuming that a name of the AR engine detected in step 45 is "ARCore" and a name of the entity tracking method detected in step 47 is "AugmentedImages", a URI of the feature data generated in step 48 is "http://server.com/outdoor/house/ARCore/AugmentedImages". This example is true when an attribute of "ARCore" is set to executed based on feature data of entity. If the attribute of "ARCore" is set to be executed based on an original image of entity, a URI of the original image described above may be used.

"ARKit" is a native AR engine capable of being on only the Apple Company's iOS platform and provides an "ARWorldTrackingConfiguration" function of estimating a camera position in a real space, an "ARGeoTrackingConfiguration" function of estimating a camera position by using a global positioning system (GPS), an "ARImageTracking-Configuration" function of tracking a two-dimensional image, an "ARObjectScanningConfiguration" function of tracking a three-dimensional object, and so on.

Assuming that the two-dimensional image illustrated in FIG. 2 is the entity detected in step 43, a URI of the entity generated in step 44 is "http://server.com/outdoor/house". Assuming that a name of the AR engine detected in step 45 is "ARKit" and a name of the entity tracking method detected in step 47 is "ARImageTracking", a URI of the feature data generated in step 48 is "http://server.com/outdoor/house/ARKit/ARImageTracking".

Assuming that the three-dimensional object illustrated in FIG. 3 is the entity detected in step 43, a URI of the entity generated in step 44 is "http://server.com/indoor/cat". Assuming that a name of the AR engine detected in step 45 is "ARKit" and a name of the entity tracking method detected in step 47 is "ARObjectScanning", a URI of the feature data generated in step 48 is "http://server.com/indoor/cat/ARKit/ARObjectScanning". These two examples are true when an attribute of "ARKit" is set to executed based on feature data of the entity. If the attribute of "ARKit" is set to be executed based on an original image of the entity, a URI of the original image described above may be used.

"Vuforia" is an AR engine of the PTC Company that may be executed on both Android and iOS, and provides an "Area Targets" function of estimating a camera position in a real space, an "Image Targets" function of tracking a two-dimensional image, a "Model Targets" function of tracking a three-dimensional object, and so on.

Assuming that the two-dimensional image illustrated in FIG. 2 is the entity detected in step 43, a URI of the entity generated in step 44 is "http://server.com/outdoor/house". Assuming that a name of the AR engine detected in step 45 is "Vuforia" and a name of the entity tracking method detected in step 47 is "ImageTargets", a URI of the feature data generated in step 48 is "http://server.com/outdoor/house/Vuforia/ImageTargets".

Assuming that the three-dimensional object illustrated in FIG. 3 is the entity detected in step 43, a URI of the entity generated in step 44 is "http://server.com/indoor/cat". Assuming that a name of the AR engine detected in step 45 is "Vuforia" and a name of the entity tracking method detected in step 47 is "Model Targets", a URI of the feature data generated in step 48 is "http://server.com/indoor/cat/Vuforia/ModelTargets". These two examples are true when an attribute of "Vuforia" is set to be executed based on feature data of the entity. Assuming that the property of "Vuforia" is set to be executed based on an original image of the entity, a URI of the original image described above may be used.

"Wikitude" is an AR engine of the Wikitude Company that may be executed on both Android and iOS and provides a "Scene Tracking" function of estimating a camera position in a real space, an "Instant Tracking" function of overlapping virtual images by recognizing a plane, an "Image Tracking" function of tracking a two-dimensional image, an "Object Tracking" function of tracking a three-dimensional object, and so on.

Assuming that the two-dimensional image illustrated in FIG. 2 is the entity detected in step 43, a URI of the entity generated in step 44 is "http://server.com/outdoor/house". Assuming that a name of the AR engine detected in step 45 is "Wikitude" and a name of the entity tracking method detected in step 47 is "ImageTracking", a URI of the feature data generated in step 48 is "http://server.com/outdoor/house/Wikitude/ImageTracking".

Assuming that the three-dimensional object illustrated in FIG. 3 is the entity detected in step 43, a URI of the entity generated in step 44 is "http://server.com/indoor/cat". Assuming that a name of the AR engine detected in step 45 is "Wikitude" and a name of the entity tracking method detected in step 47 is "ObjectTracking", a URI of the feature data generated in step 48 is "http://server.com/indoor/cat/Wikitude/ObjectTracking". These two examples are true when an attribute of "Wikitude" is set to be executed based on feature data of the entity. Assuming that an attribute of "Wikitude" is set to be executed based on an original image of the entity, a URI of the original image described above may be used.

As described above, not only functions provided by each AR engine are different depending on types of the AR engine, but also entity tracking performances of each AR engine are different depending on whether the entity corresponds to a two-dimensional image or a three-dimensional object, and the entity tracking performance of each AR engine are different depending on forms of the entity. Therefore, an augmented reality application needs to be designed such that an AR engine suitable for augmented reality content may be used according to an augmented reality service provided to a user. In order for an augmented reality application to provide high-quality augmented reality service, a plurality of different AR engines may also be used. In particular, since "ARS ore" and "ARKit" may be executed on only dedicated platforms thereof, separate augmented reality applications need to be designed for the same augmented reality service.

According to the present embodiment, independently of the AR engine and the entity tracking method, feature data of the entity is acquired from the resource server 2 by using a URI for the feature data of the entity, and the AR engine is executed based on the acquired feature data, and thus, an augmented reality application need not include multiple algorithms for generating feature data from an original image of an entity for each of the AR engine and the entity tracking method, which enables efficient development of an augmented reality application.

Entity tracking in an augmented reality space according to the present embodiment may be accomplished only by acquiring feature data of the entity from the resource server 2 by using a URI for the feature data of the entity and by calling and executing the AR engine, and thus, it is possible to provide a general-purpose augmented reality application that does not include a feature data generation algorithm dependent on an AR engine and an entity tracking method.

Since the augmented reality application need not include the feature data generation algorithm for each of the AR engine and the entity tracking method, a size of the augmented reality application may be reduced, and thus, the amount of work required to develop the augmented reality application is reduced. When developing an augmented reality application, the known augmented reality application may reuse most algorithms as they are, such as an algorithm for acquiring feature data of the entity from the resource server 2 by using a URI for feature data of the entity, and thus, an augmented reality application may be developed very easily.

Meanwhile, an entity tracking method according to an embodiment of the present disclosure described above may be written as a program executable by a processor of a computer and may be implemented in a computer that records the program in a computer-readable recording medium to execute the program. The computer includes all types of computers capable of executing a program, such as a desktop computer, a notebook computer, a smartphone, and an embedded computer. In addition, a structure of data used in the embodiment of the present disclosure described above may be recorded in a computer-readable recording medium through various means. The computer-readable recording medium includes a storage medium such as random access memory (RAM), read-only memory (ROM), a magnetic storage medium (for example, a floppy disk, a hard disk, or so on), and optically readable medium (for example, a compact disk (CD)-ROM, a digital video disk (DVD), or so on).

So far, preferred embodiments of the present disclosure are described. Those skilled in the art to which the present disclosure belongs will understand that the present disclosure may be implemented in modified forms without departing from the essential characteristics of the present disclosure. Therefore, the disclosed embodiments have to be considered in an illustrative sense rather than a restrictive sense. The scope of the present disclosure is indicated in the claims rather than the foregoing description, and all differences within the scope equivalent thereto should be construed as being included in the present disclosure.

An entity in augmented reality space may be tracked by generating a for feature data of the entity from a combination of a name of the entity and a name of an AR engine, and by acquiring the feature data of the entity representing characteristics of the entity in a format capable of being processed by the AR engine by using the URI, and by executing the AR engine based on the feature data obtained in this way, and thus, an entity may be tracked based on feature data independent of an augmented reality engine.

In this way, an entity in an augmented reality space may be tracked by acquiring feature data of an entity by using a URI independent of an augmented reality engine and by executing an AR engine based on the feature data, and thus, an augmented reality application need not include a feature data generation algorithm dependent on the augmented reality engine. That is, because the augmented reality application includes the feature data acquisition algorithm independent of the augmented reality engine, the augmented reality application need not include a feature data generation algorithm dependent on the augmented reality engine.

When an augmented reality application uses a plurality of AR engines, the augmented reality application need not include multiple algorithms for generating feature data from an original image of an entity for each AR engine, and thus, efficient augmented reality applications may be developed. An entity in an augmented reality space according to the present disclosure may be tracked only by acquiring feature data of the entity by using a URI for feature data of the entity and calling and executing the AR engine based on the feature data, and thus, a general-purpose augmented reality application not including a feature data generation algorithm dependent on an AR engine may be provided.

Because an augmented reality application need not include a feature data generation algorithm for each AR engine, a size of the augmented reality application may be reduced, and thus, the amount of work required to develop the augmented reality application may be reduced. When developing a certain augmented reality application, the known augmented reality application may reuse most algorithms, such as an algorithm for acquiring feature data of an entity by using a URI for the feature data of the entity and an augmented reality application may be easily developed.

What is claimed is:

1. A method for tracking an entity based on feature data independent of an augmented reality engine, the method comprising:
generating a uniform resource identifier (URI) for feature data of a first entity from a combination of a name of the first entity and a name of a first AR engine;
acquiring feature data of the first entity representing characteristics of the first entity in a format capable of being processed by the first AR engine by using the URI for the feature data of the first entity; and
tracking the first entity in an augmented reality space by executing the first AR engine based on the acquired feature data of the first entity.

2. The method of claim 1,
wherein, during the generating of the URI for the feature data of the first entity, the URI for the feature data of the first entity is generated from a combination of a host name of a resource server, a name of the first entity, and a name of the first AR engine, and
wherein, during the acquiring of the feature data of the first entity, the feature data of the first entity is acquired from the resource server by requesting the resource server corresponding to a host of the URI for the feature data of the first entity to send the feature data of the first entity by using the URI for the feature data of the first entity.

3. The method of claim 2, further comprising:
generating the URI of the first entity from a combination of the host name of the resource server and the name of the first entity; and
detecting the first AR engine to be used for tracking the first entity from among a plurality of AR engines,
wherein, during the generating of the URI for the feature data of the first entity, the URI for the feature data of the first entity is generated by adding a name of the detected first AR engine to the generated URI of the first entity.

4. The method of claim 3, further comprising:
detecting an entity tracking method to be used by the first AR engine for the first entity,
wherein, during the generating of the URI for the feature data of the first entity, the URI for the feature data of the first entity is generated by adding a name of the detected first AR engine and a name of the detected entity tracking method to the generated URI of the first entity.

5. The method of claim 4,
wherein, during the detecting of the entity tracking method, the entity tracking method to be used by the first AR engine is detected according to whether the first entity corresponds to a two-dimensional image or a three-dimensional object.

6. The method of claim 2, further comprising:
determining whether the first AR engine requires either the feature data of the first entity or an original image of the first entity in order to track the first entity,
wherein, during the generating the URI for the feature data of the first entity, the URI for the feature data of the first entity is generated when the first AR engine is determined to require the feature data of the first entity.

7. The method of claim 6, further comprising:
generating a URI for the original image of the first entity from the combination of the host name of the resource server and the name of the first entity when the first AR engine is determined to require the original image of the first entity;

acquiring the original image of the first entity by using the URI for the original image of the first entity; and tracking the first entity in the augmented reality space by executing the first AR engine based on the acquired original image of the first entity.

8. The method of claim 1, further comprising:

detecting at least one entity in the augmented reality space indicated by augmented reality content from the augmented reality content, wherein, during the generating of the URI for the feature data of the first entity, the URI for the feature data of the first entity is generated from a combination of the name of the first entity and the name of the first AR engine among the detected at least one entity.

9. The method of claim 1, further comprising:

generating a URI for feature data of a second entity from a combination of a name of the second entity and a name of a second AR engine;

acquiring feature data of the second entity representing characteristics of the second entity in a format capable of being processed by the second AR engine by using the URI for the feature data of the second entity; and tracking the second entity in an augmented reality space by executing the second AR engine based on the acquired feature data of the second entity.

10. A non-transitory computer-readable recording medium in which a program for executing the method of claim 1 on a computer is recorded.

11. An apparatus for tracking an entity based on feature data independent of an augmented reality engine, the apparatus comprising:

a URI processing unit configured to generate a URI for feature data of a first entity from a combination of a name of the first entity and a name of a first AR engine; and an AR processing unit configured to acquire the feature data of the first entity representing characteristics of the first entity in a format capable of being processed by the first AR engine by using the URI for the feature data of the first entity and configured to track the first entity in an augmented reality space by executing the first AR engine based on the acquired feature data of the first entity.

* * * * *